(12) United States Patent
Huang et al.

(10) Patent No.: US 9,630,166 B1
(45) Date of Patent: Apr. 25, 2017

(54) METHOD OF FABRICATING CATALYST CARRIER FOR GENERATING HYDROGEN THROUGH METHANE REFORMATION

(71) Applicant: Institute of Nuclear Energy Research, Atomic Energy Council, Executive Yuan, R.O.C., Taoyuan (TW)

(72) Inventors: Meng-han Huang, Taoyuan (TW); Yi-Sin Chou, New Taipei (TW); Ning-Yih Hsu, Keelung (TW); Ruey-Yi Lee, Taoyuan (TW); Wen-Song Hwang, Taoyuan (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 0 days.

(21) Appl. No.: 15/014,104

(22) Filed: Feb. 3, 2016

(51) Int. Cl.
| | | |
|---|---|---|
| *B01J 21/02* | (2006.01) | |
| *B01J 21/04* | (2006.01) | |
| *B01J 23/10* | (2006.01) | |
| *B01J 23/42* | (2006.01) | |
| *B01J 23/56* | (2006.01) | |
| *B01J 23/63* | (2006.01) | |
| *B01J 27/20* | (2006.01) | |
| *B01J 37/00* | (2006.01) | |
| *B01J 37/04* | (2006.01) | |
| *B01J 37/08* | (2006.01) | |

(52) U.S. Cl.
CPC ............ *B01J 21/04* (2013.01); *B01J 37/0009* (2013.01); *B01J 37/04* (2013.01); *B01J 37/08* (2013.01)

(58) Field of Classification Search
CPC ... B01J 21/02; B01J 21/04; B01J 23/10; B01J 23/42; B01J 23/56; B01J 23/63; B01J 27/20; B01J 37/0009; B01J 37/04; B01J 37/08
USPC ....... 502/185, 304, 327, 332, 334, 339, 355, 502/439
See application file for complete search history.

(56) References Cited

U.S. PATENT DOCUMENTS

| | | | | |
|---|---|---|---|---|
| 3,310,366 | A * | 3/1967 | Koepernik | ............. B01D 53/86 423/212 |
| 5,872,075 | A * | 2/1999 | Iwakura | ................... B01J 23/42 502/325 |
| 7,253,135 | B2 * | 8/2007 | Wei | ......................... B01J 21/12 502/202 |

(Continued)

*Primary Examiner* — Cam N. Nguyen
(74) *Attorney, Agent, or Firm* — Jackson IPG PLLC; Demian K. Jackson

(57) ABSTRACT

A method is provided for fabricating a catalyst carrier. At first, aluminum hydroxide is used for forming an alumina powder. The alumina powder is mixed with carbon nanotubes and a complex additive to be shaped into a cake. The cake is kneaded into a noodle-like shape to be hot-dried. Then, calcination is processed in a furnace under 1200 celsius degrees (° C.) with air passed through. The crystal structure remains without phase change. A catalyst carrier of α-alumina having nano-scaled pores is formed. The catalyst carrier is a powdery material made into different three-dimensional forms. The catalyst carrier thus fabricated is suitable for generating hydrogen through methane reformation. The catalyst carrier has a methane conversion greater than 99 percents. The catalyst carrier will not be crumbled under 800° C. for 4000 hours without carbon deposit.

10 Claims, 4 Drawing Sheets

(56) References Cited

U.S. PATENT DOCUMENTS

| | | | |
|---|---|---|---|
| 7,572,427 B2 * | 8/2009 | Nagy | B82Y 10/00 |
| | | | 423/447.3 |
| 7,691,774 B2 * | 4/2010 | Watanabe | B01J 21/04 |
| | | | 208/138 |
| 7,838,459 B2 * | 11/2010 | Nagy | B82Y 10/00 |
| | | | 502/240 |
| 2011/0218288 A1 * | 9/2011 | Kambara | B01J 21/04 |
| | | | 524/495 |

* cited by examiner

METHOD OF FABRICATING CATALYST CARRIER FOR GENERATING HYDROGEN THROUGH METHANE REFORMATION

TECHNICAL FIELD OF THE INVENTION

The present invention relates to fabricating a catalyst carrier; more particularly, relates to using aluminum hydroxide ($Al(OH)_3$) and carbon nanotubes to fabricate an $\alpha$-alumina ($\alpha$-$Al_2O_3$) carrier for further obtaining a catalyst with the carrier, where the $\alpha$-$Al_2O_3$ carrier is a powdery material made into different three-dimensional (3D) forms.

DESCRIPTION OF THE RELATED ART

On pursuing economic growth in the world, the demand for energy is increasing, but the available stock of fossil fuels is dwindling. In the foreseeable future, human will face increasing energy cost and energy shortages. Moreover, under more and more strict regulations for environmental quality, emissions of greenhouse gases (mainly carbon dioxide) catch more of the world's attention. Therefore, seeking high-performance and new clean energies has gradually become an urgent need. Therein, solid oxide fuel cell (SOFC) is one of the most promising clean energy in the future. It is mainly because of its advantages on high power generation efficiency and a low rate of carbon dioxide release.

According to the types of hydrogen-containing materials, sources for generating hydrogen through recombination can be divided into natural gas, petroleum, coal, electrolytic water, etc. But, natural gas is the main source for generating hydrogen. The amount of natural gas abundantly reserved is about twice the total organic carbon potential of known global fossil fuels so that natural gas is likely to become one of the most important energy resources in the 21st century. Therefore, all countries in the world strive to research and develop for generating hydrogen with natural gas in order to occupy a position for handling energy in the future. The main component of natural gas is methane ($CH_4$), whose content is about 85~95 percents (%). $CH_4$ is a hydrocarbon having the highest hydrogen ratio and has the highest rate on generating hydrogen. Hydrogen-rich gas formed after thermal recombination with the natural gas can be provided to and used by SOFC.

In general, factors considered for selecting a catalyst carrier include specific surface area (affecting distribution of active sites), porosity (affecting mass transfer and heat transfer), particle size (drop amount) and mechanical strength. $\gamma$-alumina ($\gamma$-$Al_2O_3$) is the most widely used carrier for catalyst, which can be used in a methane reformer for SOFC. It is because of its cheap price and large surface area; so that is often used in synthesizing a catalyst carrier. But, when being used in high-temperature hydrogen recombination, the carrier may be crumbled and carbon generated may be covered on catalyst surface, which may block catalyst pores to decrease catalyst activity. Furthermore, hydrogen-rich gas generated at back end may have pulse pressure drop owing to instable flow. Moreover, catalyst dust may contaminate SOFC at rear end through gas pipeline to cause obstruction and make system crashed. Hence, the mechanical strength of the catalyst carrier has enormous impact on other devices.

Now, industries usually use $\gamma$-$Al_2O_3$ as a carrier for catalyst on generating hydrogen through methane reformation. Yet, the carrier may be further become inactive by being crumbled, coked and obstructed when the reformation is processed under high temperature.

Hence, the prior art does not fulfill all users' requests on actual use.

SUMMARY OF THE INVENTION

The main purpose of the present invention is to combine $Al(OH)_3$ and carbon nanotubes for improving thermal stability and mechanical strength of a catalyst carrier, where a fabrication process of a composite carrier is improved to obtain an $\alpha$-$Al_2O_3$ carrier having pores and mechanical strength matched with each other; the $\alpha$-$Al_2O_3$ carrier is suitable to be used as a fuel recombination catalyst for SOFC power generator; the catalyst not only has a methane conversion rate greater than 99%, but also will not be crumbled and coked at 800° C. with 4000 hrs of durability; and the present invention combines $Al(OH)_3$ and carbon nanotubes to obtain the $\alpha$-$Al_2O_3$ carrier for achieving long-term advantages of anti-powdering and anti-coking.

Another purpose of the present invention is to provide a powder of the $\alpha$-$Al_2O_3$ carrier made into different 3D forms.

To achieve the above purposes, the present invention is a method of fabricating a catalyst carrier for generating hydrogen through methane reformation, comprising steps of: (a) obtaining $Al(OH)_3$ to be placed in a furnace and dried under a temperature of 95~140° C. and, then, placed in a high-temperature furnace to be calcined at a temperature of 320~480° C. for 4~6 hours to obtain an alumina powder; (b) mixing the alumina powder with carbon nanotubes to be added with a complex additive; (c) kneading the carbon nanotubes, $Al(OH)_3$ and the complex additive in a kneading device to obtain a cake; (d) putting the kneaded cake into an extruding machine to be extruded into a noodle-like shape; and (e) drying the extruded noodle-like carrier under a temperature of 110~150° C. and, at last, processing high-temperature calcination to obtain an $\alpha$-alumina ($\alpha$-$Al_2O_3$) carrier distributed with a plurality of nano-scaled pores. Accordingly, a novel method of fabricating a catalyst carrier for generating hydrogen through methane reformation is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1~FIG. 4, which are a flow view showing a preferred embodiment according to the present invention; a structural view showing an $\alpha$-$Al_2O_3$ carrier; a view showing efficiency of the carrier; and a view showing gas composition obtained after a process for generating hydrogen. As shown in the figures, the present invention is a method of fabricating a catalyst carrier for generating hydrogen through methane reformation, comprising the following steps:

(a) Step s101—Fabricating alumina powder: Aluminum hydroxide (Al(OH)$_3$) is obtained to be placed in a furnace to be dried with a temperature set at 95~140 celsius degrees (° C.); and, then, is placed in the high-temperature furnace to be calcined at 320~480° C. for 4~6 hours (hr) to obtain an alumina powder.

(b) Step s102—Mixing: Carbon nanotubes are mixed with the alumina powder at a weight ratio of 3:97 to be added with a complex additive. The complex additive has an adding amount of 1%~3% to a total mass of the carbon nanotubes and the alumina powder. Therein, the complex additive comprises a diluted nitric acid, an extrusion aid, an adhesive and a lubricant; the extrusion aid is sesbania powder and/or kaolin; the adhesive is methyl cellulose; and, the lubricant is magnesium stearate.

(c) Step s103—Kneading: The carbon nanotubes, Al(OH)$_3$ and the complex additive are kneaded in a kneading device to obtain a cake.

(d) Step s104—Extruding: The kneaded cake is put into an extruding machine to be extruded into a noodle-like shape.

Figure 1:
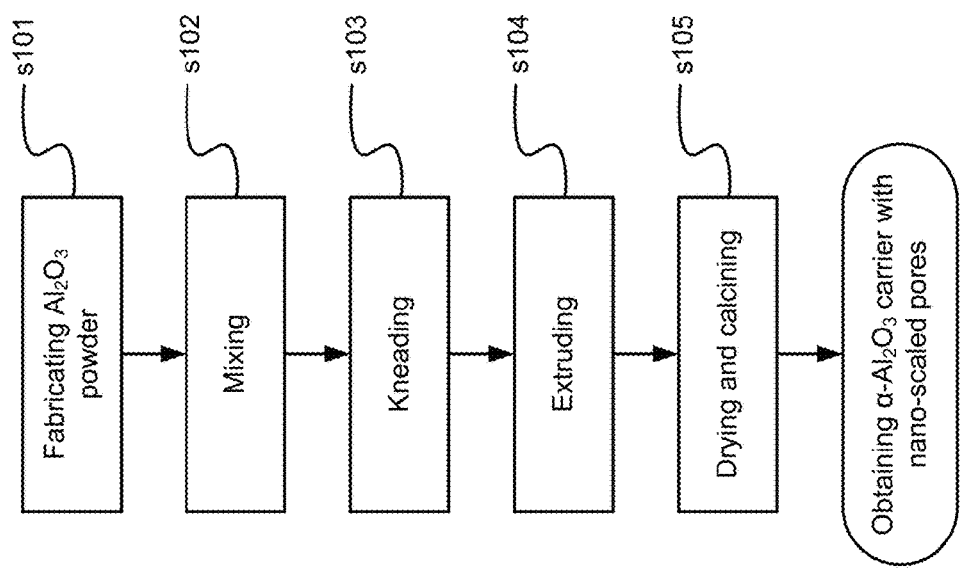
FIG. 1 is the flow view showing the preferred embodiment according to the present invention.
Figure 2:
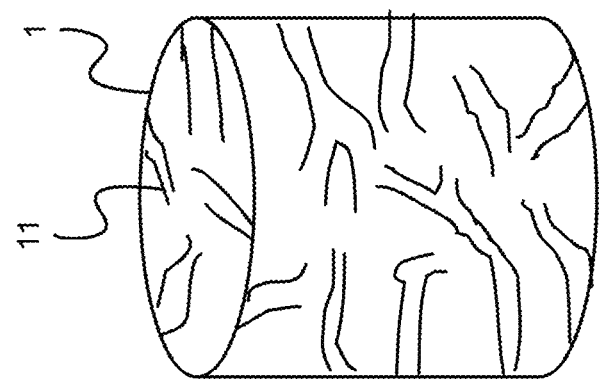
FIG. 2 is the structural view showing the $\alpha$-alumina ($\alpha$-$Al_2O_3$) carrier.

(e) Step s105—Drying and calcining: The extruded noodle-like carrier is dried under a temperature of 110~150° C. Then, the temperature is raised by heating from a room temperature to 320~480° C. at a rate of 2 celsius degrees per minute (° C./min) followed by holding the temperature for 1.5~2.5 hrs; the temperature is raised to 520~780° C. at a rate of 1° C./min followed by holding the temperature for 1.5~2.5 hrs; and, at last, the temperature is raised to 1080~1320° C. at a rate of 1° C./min followed by holding the temperature for 4~6 hrs. Therein, the material still maintains a stable crystal structure without phase change to obtain an α-Al$_2$O$_3$ carrier 1 (as shown in FIG. 2) distributed with a plurality of nano-scaled pores. The α-Al$_2$O$_3$ carrier 1 is a powdery material made into different three-dimensional (3D) forms, like cylindrical, granular, spherical, honeycomb forms.

Thus, a novel method of fabricating a catalyst carrier for generating hydrogen through methane reformation is obtained.

The present invention put Al(OH)$_3$ in a furnace to be dried with a temperature set at 120° C. Then, calcination is processed at 400° C. for 5 hrs in the high-temperature furnace to obtain the alumina powder. Then, 3 percents (%) of carbon nanotubes and the alumina powder are mixed at a weight ratio of 3:97 to be added with the complex additive. The complex additive has an adding amount of 1%~3% to a total mass of the carbon nanotubes and the alumina powder. Then, the carbon nanotubes, Al(OH)$_3$ and the complex additive are kneaded in the kneading device to obtain a cake. As follows, the kneaded cake is put into the extruding machine to be extruded into a noodle-like shape. At last, the extruded noodle-like carrier is dried under a temperature of 110~150° C. to be calcined in the high-temperature furnace with air passed through. Then, the temperature is raised to 400° C. followed by holding the temperature for 2 hrs. Then, the temperature is raised to 650° C. at a rate of 1° C./min followed by holding the temperature for 2 hrs. At last, the temperature is raised to 1200° C. at a rate of 1° C./min followed by holding the temperature for 5 hrs. Thus, a porous α-Al$_2$O$_3$ carrier 1 is fabricated.

Figure 3:
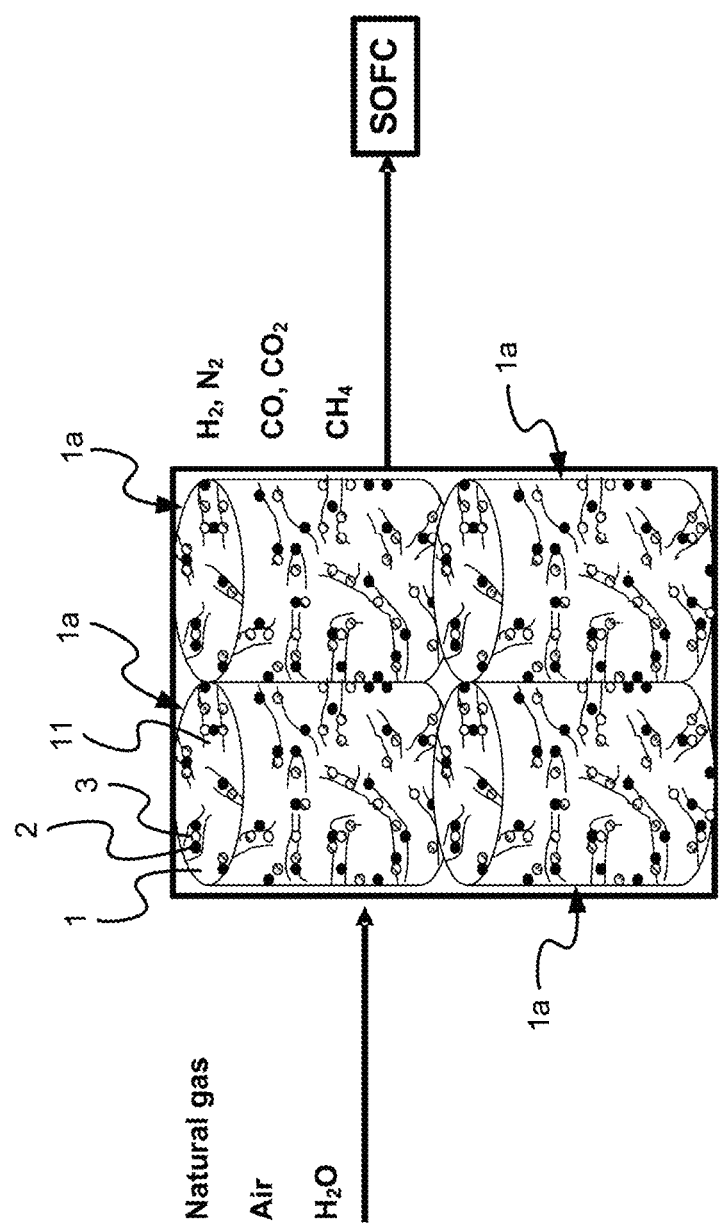
FIG. 3 is the view showing the efficiency of the carrier.

During fabricating the carrier, the carbon nanotubes will be formed into nano-scaled pores to be distributed by high-temperature oxidation in the calcination. The nano-scaled pores are suitable for active metal catalysts coated on surface for improving metal dispersion. Then, the α-Al$_2$O$_3$ carrier is tempered with a high temperature to obtain high mechanical strength along with the advantages of both alumina and the carbon nanotubes. In FIG. 2, the present invention fabricates an α-Al$_2$O$_3$ carrier 1 distributed with a plurality of nano-scaled pores 11. The α-Al$_2$O$_3$ carrier 1 can be further impregnated to coat active metals of platinum (Pt) 2 and cerium dioxide (CeO$_2$) 3 on surface of the α-Al$_2$O$_3$ carrier 1 and to embed the active metals into the nano-scaled pores 11. Thus, a carrier of Pt/CeO$_2$/α-Al$_2$O$_3$ 1a is formed, as shown in FIG. 3.

Figure 4:
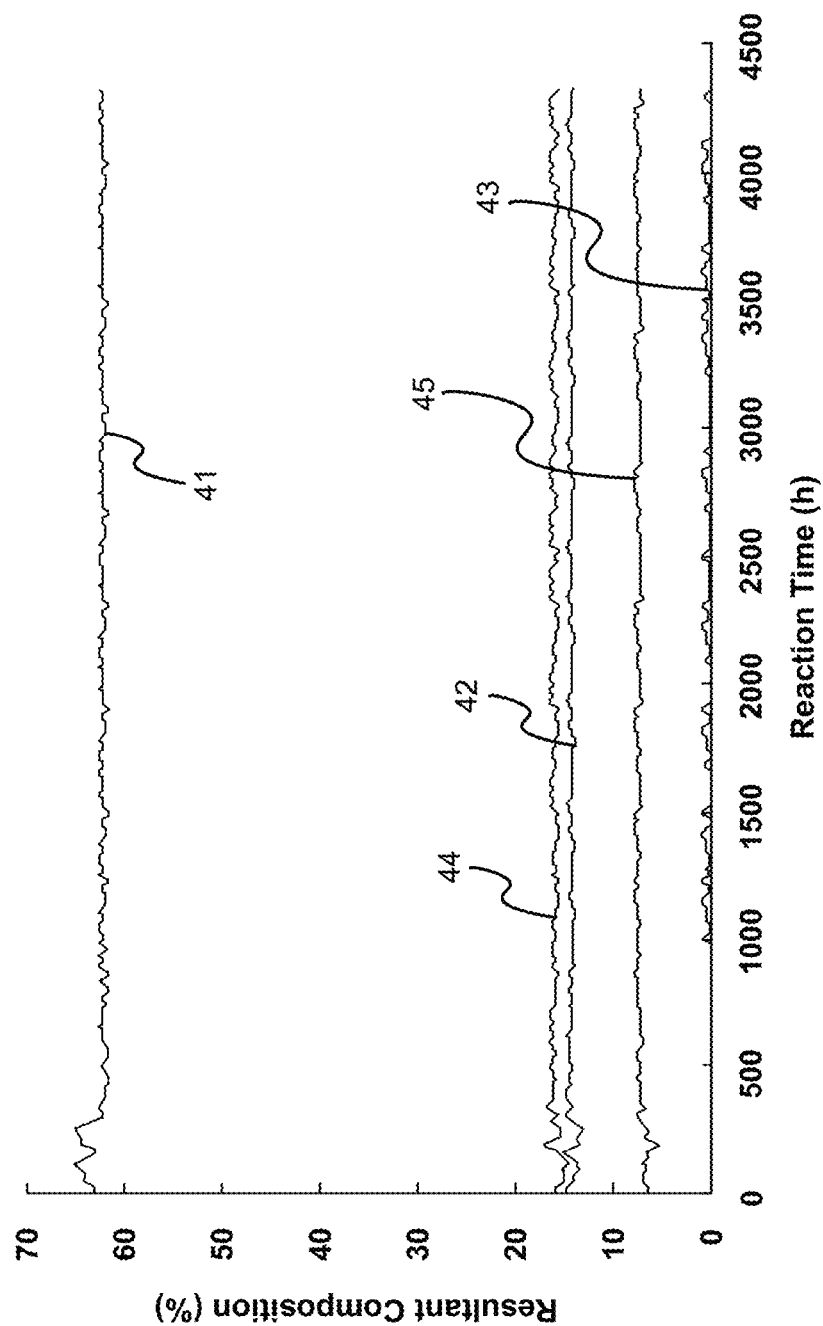
FIG. 4 is the view showing the gas composition obtained after the process for generating hydrogen.

On processing test, the Pt/CeO$_2$/α-Al$_2$O$_3$ catalyst 1a is used for obtaining catalyst performance. As shown in FIG. 3, thermal reaction is used for recombination. The reactants include natural gas, air and water (H$_2$O). After being mixed with the three reactants, the Pt/CeO$_2$/α-Al$_2$O$_3$ catalyst 1a is processed through a recombination reaction at a high temperature for generating hydrogen. After the thermal recombination reaction, a hydrogen-rich gas is obtained to be provided to and used by a solid oxide fuel cell (SOFC). After being used in SOFC for gas recombination for 4000 hrs, the catalyst is obtained for analysis. In FIG. 4, a good catalyst performance is shown. Al$_2$O$_3$ and carbon nanotubes are combined to fabricate the Pt/CeO$_2$/α-Al$_2$O$_3$ catalyst for improving thermal stability and mechanical strength of the catalyst carrier. Pt and CeO$_2$ are formed in the nano-scaled pores 11 to effectively increase reaction area and to further increase residence time of reaction. By analyzing the gas at an outlet obtained from the recombination reaction for generating hydrogen with the Pt/CeO$_2$/α-Al$_2$O$_3$ catalyst 1 a, a first curve 41 shows a hydrogen concentration about 68 percents (%); a second curve 42 shows a nitrogen concentration about 11.31%; a fourth curve 44 shows a carbon monoxide (CO) concentration about 15.48%; and a fifth curve 45 shows a carbon dioxide (CO$_2$) concentration about 6%. In the first curve 41, the hydrogen concentration reaches more than 65% with no significant declination. Besides, a third curve 43 for methane (CH$_4$) shows that, after the reaction using the Pt/CeO$_2$/α-Al$_2$O$_3$ catalyst 1a is finished, almost no methane is found. It means that a methane conversion rate is greater than 99% and the Pt/CeO$_2$/α-Al$_2$O$_3$ catalyst 1a has a high activity toward natural gas.

In addition, the Pt/CeO$_2$/α-Al$_2$O$_3$ catalyst 1a can withstand more than 4,000 hours of durability test without being crumbled. It proves that the catalyst carrier fabricated for generating hydrogen through methane reformation can resist thermal cycling of SOFC at 800° C. for dozens of harsh operation. With no coke found, activity is not diminished either. It shows that the α-Al$_2$O$_3$ carrier distributed with a plurality of nano-scaled pores, which is fabricated according to the present invention, is suitable to be used as a fuel recombination catalyst for a SOFC power generator—particularly suitable to be used as a catalyst carrier for generating hydrogen through recombination.

Hence, the present invention fabricates a catalyst carrier having high-temperature thermal stability. Al(OH)$_3$ and carbon nanotubes are combined to improve thermal stability and mechanical strength of the catalyst carrier, where the combining process for fabricating the carrier is improved to obtain the α-Al$_2$O$_3$ carrier with multiple pores and mechanical strength matched with each other. The α-Al$_2$O$_3$ carrier is a powdery material made into different 3D forms, which is suitable to be used as a fuel recombination catalyst for SOFC power generator. The Pt/CeO$_2$/α-Al$_2$O$_3$ catalyst fabricated by using the porous α-Al$_2$O$_3$ carrier can replace the prior-art γ-alumina carrier, which is conformed to the requirements of new catalyst carrier for fuel recombination catalyst used in SOFC power generator. The catalyst is used to generate hydrogen having a concentration reaching about 68%, which shows a good performance on generating hydrogen with natural gas. It not only solves problems of powdering, coking and blocking; but also enhances the conversion rate to more than 99% on generating hydrogen through methane reformation. The catalyst will not be crumbled and coked at 800° C. with 4000 hrs of durability. In a word, the present invention combines Al(OH)$_3$ and carbon nanotubes to obtain an α-Al$_2$O$_3$ carrier for achieving long-term advantages of anti-powdering and anti-coking.

To sum up, the present invention is a method of fabricating a catalyst carrier for generating hydrogen through methane reformation, where Al(OH)$_3$ and carbon nanotubes are combined to obtain an α-Al$_2$O$_3$ carrier having multiple pores and to further fabricate a catalyst with the carrier; problems of powdering, coking and blocking are solved; a conversion rate is enhanced to more than 99% on generating hydrogen through methane reformation; the catalyst will not be crumbled and coked at 800° C. with 4000 hrs of durability; and, in a word, the present invention combines Al(OH)$_3$ and carbon nanotubes to obtain the α-Al$_2$O$_3$ carrier for achieving long-term advantages of anti-powdering and anti-coking.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a catalyst carrier for generating hydrogen through methane reformation, comprising steps of
    (a) heat treating aluminum hydroxide (Al(OH)$_3$) in a furnace and drying said Al(OH)$_3$ under a temperature of 95-140° C. and, then, placing said Al(OH)$_3$ in a high-temperature furnace to be calcined at a temperature of 320-480° C. for 4-6 hours to obtain an alumina powder;
    (b) mixing said alumina powder with carbon nanotubes to be added with a complex additive;
    (c) kneading said carbon nanotubes, said alumina powder and said complex additive in a kneading device to obtain a cake;
    (d) extruding said kneaded cake using an extruding machine to extrude an extruded carrier; and
    (e) drying said extruded carrier under a temperature of 110-150° C. and calcining said extruded carrier to obtain an α-alumina (α-Al$_2$O$_3$) carrier distributed with a plurality of nano-scaled pores.

2. The method according to claim 1,
    wherein, in step (b), said carbon nanotubes are mixed to said alumina powder at a weight ratio of 3:97; and said complex additive has an adding amount of 1%-3% to a total mass of said carbon nanotubes and said alumina powder.

3. The method according to claim 1,
    wherein said complex additive comprises a diluted nitric acid, an extrusion aid, an adhesive and a lubricant.

4. The method according to claim 3,
    wherein said extrusion aid is sesbania powder and/or kaolin.

5. The method according to claim 3,
    wherein said adhesive is methyl cellulose.

6. The method according to claim 3,
    wherein said lubricant is magnesium stearate.

7. The method according to claim 1,
    wherein, in step (e), said calcination is processed by heating from a room temperature to a temperature of 320-480° C. at a rate of 2 celsius degrees per minute (° C./min) followed by holding said temperature for 1.5~2.5 hours (hr); then, said temperature is raised to 520~780° C. at a rate of 1° C./min followed by holding said temperature for 1.5-2.5 hrs; and, at last, said temperature is raised to 1080-1320° C. at a rate of 1° C./min followed by holding said temperature for 4-6 hrs.

8. The method according to claim 1,
    wherein said α-Al$_2$O$_3$ carrier is a powdery material made into different three-dimensional forms.

9. The method according to claim 1,
    wherein said α-Al$_2$O$_3$ carrier is further impregnated to coat active metals on surface of said α-Al$_2$O$_3$ carrier and embed said active metals into said nano-scaled pores.

10. The method according to claim 9,
    wherein said α-Al$_2$O$_3$ carrier is a catalyst of Pt/CeO$_2$/α-Al$_2$O$_3$.

* * * * *